United States Patent
Ma et al.

(10) Patent No.: US 10,621,895 B2
(45) Date of Patent: Apr. 14, 2020

(54) EJECTION DEVICE

(71) Applicant: Unilumin Group Co., Ltd., Shenzhen (CN)

(72) Inventors: Hongbo Ma, Shenzhen (CN); Jinfeng He, Shenzhen (CN); Mingfeng Lin, Shenzhen (CN)

(73) Assignee: Unilumin GroupCo., Ltd., Shenzhen (CN)

( * ) Notice: Subject to any disclaimer, the term of this patent is extended or adjusted under 35 U.S.C. 154(b) by 337 days.

(21) Appl. No.: 15/554,296

(22) PCT Filed: Oct. 18, 2016

(86) PCT No.: PCT/CN2016/102313
§ 371 (c)(1),
(2) Date: Aug. 29, 2017

(87) PCT Pub. No.: WO2017/181624
PCT Pub. Date: Oct. 26, 2017

(65) Prior Publication Data
US 2018/0130386 A1 May 10, 2018

(30) Foreign Application Priority Data
Apr. 19, 2016 (CN) .................. 2016 2 0328426 U

(51) Int. Cl.
*G09F 9/37* (2006.01)
*G09F 9/302* (2006.01)
(Continued)

(52) U.S. Cl.
CPC ............ *G09F 9/375* (2013.01); *B23P 19/006* (2013.01); *G09F 9/301* (2013.01); *G09F 9/3026* (2013.01); *G09F 9/33* (2013.01); *G09F 9/37* (2013.01)

(58) Field of Classification Search
CPC ... G09F 9/37; G09F 9/375; G09F 9/33; B23P 19/006
See application file for complete search history.

(56) References Cited

U.S. PATENT DOCUMENTS 5,656,982 A * 8/1997 Kurahara ............. H01H 36/004
335/205
9,845,816 B2 * 12/2017 Brashnyk ............... G09F 9/3026
(Continued)

FOREIGN PATENT DOCUMENTS

CA 2 778860 A1 11/2013
CN 2562501 Y 7/2003
(Continued)

OTHER PUBLICATIONS

CN205571847U_English Abstract.
(Continued)

*Primary Examiner* — A. Dexter Tugbang
*Assistant Examiner* — Jeffrey T Carley
(74) *Attorney, Agent, or Firm* — Ladas & Parry LLP

(57) ABSTRACT

The utility model discloses an ejection device, comprising a housing, an ejector, a rotor, a drive unit and guide units, wherein the housing is a hollow structure with an opening; the ejector is disposed in the housing; the drive unit drives the rotor to rotate; during rotating, the rotor drives the ejector to rotate along the circumference of the housing and drives the ejector to move toward the opening; guide slots are formed on the inner wall of the housing; the guide slots are disposed along the ejection direction of the ejector; and the guide units are disposed on the outer wall of the ejector and slidably disposed in the guide slots. The ejection device provided by the utility model is not only easily operated, but also simple in structure and small in size, does not require a large magnet, and can reduce the product weight.

7 Claims, 2 Drawing Sheets

(51) Int. Cl.
*B23P 19/00* (2006.01)
*G09F 9/30* (2006.01)
*G09F 9/33* (2006.01)

(56) References Cited

U.S. PATENT DOCUMENTS

2011/0148621 A1* 6/2011 Neukirch ............... A63H 33/26
 340/531
2013/0010408 A1* 1/2013 Lin ........................ G09F 9/33
 361/679.01
2016/0210886 A1* 7/2016 Brashnyk .............. G09F 9/3026
2018/0043517 A1* 2/2018 Gauthier ............... G01L 25/003

FOREIGN PATENT DOCUMENTS

| CN | 102865346 A | | 1/2013 |
| CN | 103646619 A | * | 3/2014 |
| CN | 104240614 A | | 12/2014 |
| CN | 204178650 U | | 2/2015 |
| CN | 104668376 A | | 6/2015 |
| CN | 205571847 U | | 9/2016 |
| CN | 206058813 U | * | 3/2017 |
| WO | 2014/172848 A1 | | 10/2014 |

OTHER PUBLICATIONS

CN104240614A_English Abstract.
CN104668376A_English Abstract.
CN102865346A_English Abstract.
CN2562501Y_English Abstract.
CN204178650U_English Abstract.
CN2778860A1_English Abstract.

* cited by examiner

EJECTION DEVICE

RELATED APPLICATION

This application is a national phase entry under 35 USC 371 of International Patent Application No.: PCT/CN2016/102313 filed on Oct. 18, 2016, which claims priority from Chinese Application No. 201620328426.4 filed on Apr. 19, 2016, the disclosures of which are incorporated in their entirety by reference herein.

TECHNICAL FIELD

The present description relates to the technical field of LED screens, in particular to an ejection device.

DESCRIPTION OF RELATED ART

At present, the maintenance of LED screens includes front maintenance and rear maintenance. To perform the rear maintenance, it requires taking down a rear cover and then pushing out a module from the rear side. The operation process is relatively complicated. Front maintenance refers to taking out the module from the front. For a front maintenance-type LED screen, the module can be directly taken down from the front. The operation is relatively convenient. For front maintenance in the prior art, a general method is to install a large iron piece on the module. When taking out the module is required, a large strong magnet is used to take out the module through magnetic attraction. Installing a large iron piece on the module not only increases the product weight, but also enlarges the product.

BRIEF SUMMARY OF THE INVENTION

The technical problem to be solved is to provide a small-sized and portable ejection device which is conveniently operated.

The following technical solution is employed.

An ejection device includes a housing, an ejector, a rotor, a drive unit and guide units, wherein the housing is a hollow structure with an opening; the ejector is disposed in the housing; the drive unit drives the rotor to rotate; during rotating, the rotor drives the ejector to rotate along the circumference of the housing and drives the ejector to move toward the opening; guide slots are formed on the inner wall of the housing; the guide slots are disposed along the ejection direction of the ejector; and the guide units are disposed on the outer wall of the ejector and slidably disposed in the guide slots.

Further, the rotor is disposed in the ejector; the rotor is a screw, and the ejector is a screw barrel.

Further a reed switch is also included and the reed switch is electrically connected with the drive unit.

Further, a circuit board is also included; the circuit board is disposed on the outer wall of the housing; and the circuit board is electrically connected with the drive unit.

Further, a first limit switch and a second limit switch are also included; the first limit switch and the second limit switch are respectively disposed on the circuit board and are electrically connected with the circuit board; the guide slots are formed with openings at the bottoms; the guide units extend out of the openings; and the guide units are disposed between the first limit switch and the second limit switch.

Further, a cushion is also included, and the cushion is disposed on the ejector and positioned at the opening end of the housing.

Further, the numbers of the guide slot and the guide unit are respectively two; the two guide slots are respectively symmetrically disposed on the housing, and the two guide units are respectively symmetrically disposed on the ejector.

The ejection device of the present invention has the following beneficial effects. The drive unit drives the rotor to rotate; the rotor drives the ejector to rotate along the circumference of the housing and drives the ejector to move toward the opening; the guide units are disposed on the outer wall of the ejector and slidably disposed in the guide slots, so when the drive unit drives the rotor to rotate, the guide slots stop the ejector from rotating along with the rotor, and the ejector moves toward the opening. A module is disposed in front of the ejector, and when the ejector moves toward the opening, the module is ejected out. The ejection device of the present invention is not only conveniently operated, but also simple in structure and small in size, does not require a large magnet, and can reduce the product weight.

DESCRIPTION OF MARKS

Housing—1; Guide slot—11; ejector—2; rotor—3; drive unit—4; guide unit—5; reed pipe—6; circuit board—7; first limit switch—8; second limit switch—9; cushion—10.

DETAILED DESCRIPTION OF THE INVENTION

The technical contents, fulfilled objective, and effects of the utility model are described in detail in conjunction with the embodiments and attached drawings.

The most key concept of the utility model is as follows. Through the match between a rotor and an ejector, the ejector moves toward an opening. The operation is easy and convenient and the structure is simple.

Figure 1:
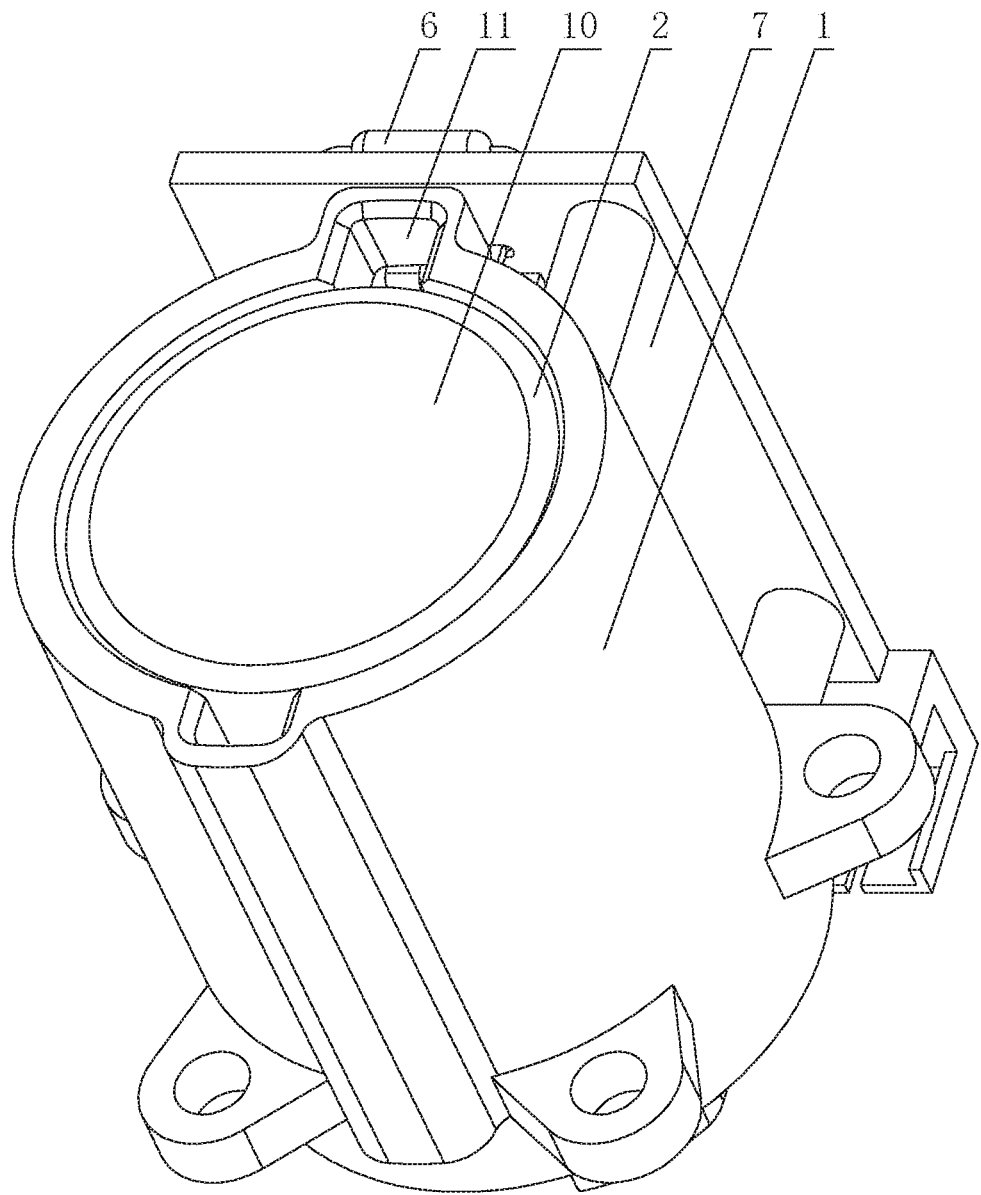
FIG. 1 is a structural view of an injection device in the embodiment of the present invention.
Figure 2:
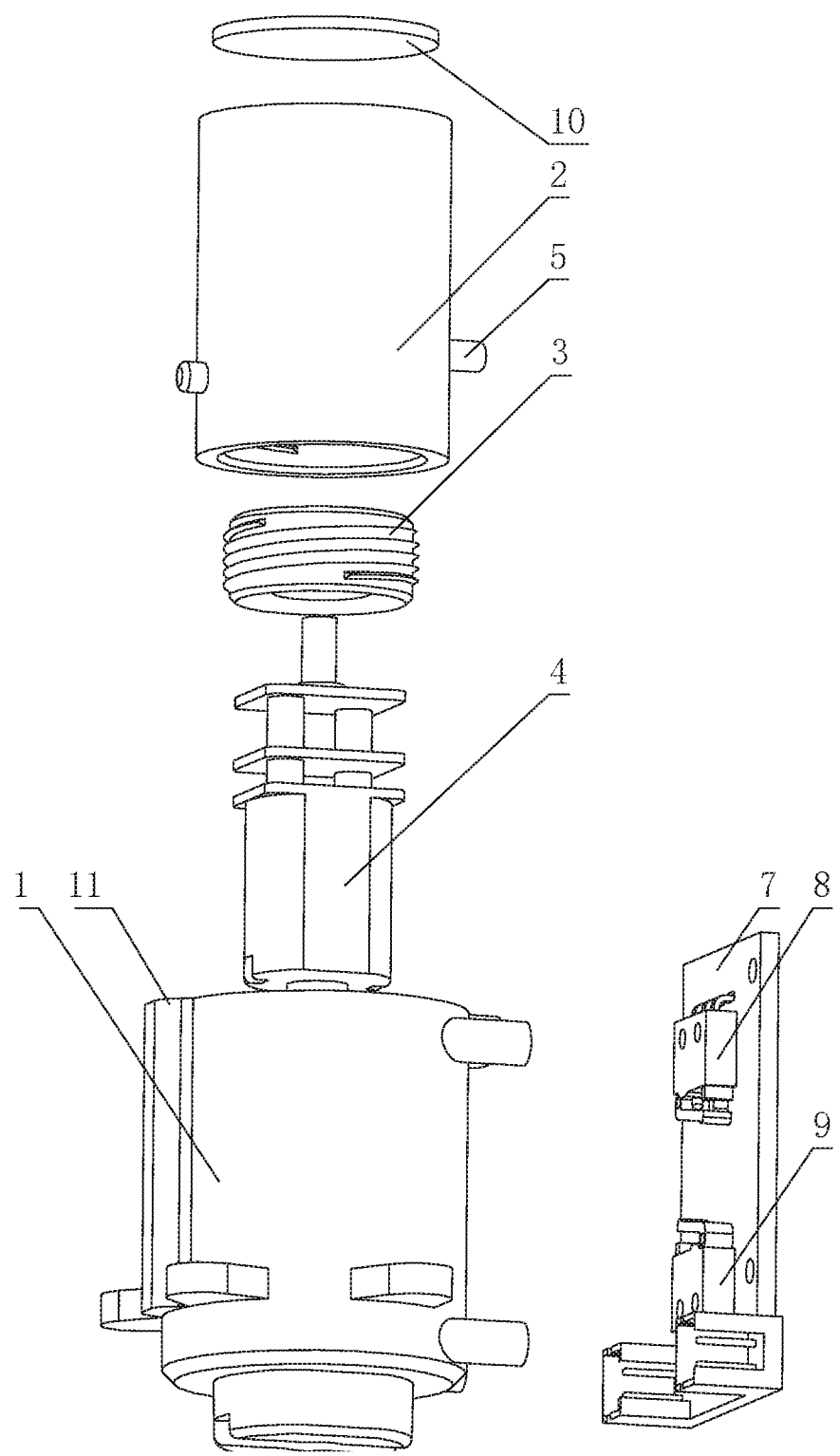
FIG. 2 is an exploded view of the injection device in an embodiment

Refer to FIG. 1 and FIG. 2. An ejection device includes a housing 1, an ejector 2, a rotor 3, a drive unit 4 and guide units 5. The housing 1 is a hollow structure with an opening. The ejector 2 is disposed in the housing 1. The rotor 3 is disposed in the ejector 2. The rotor 3 is in a transmission connection with the drive unit 4. The rotor 3 drives the ejector 2 to rotate along the circumference of the housing 1 and to move toward the opening. Guide slots 11 are formed on the inner wall of the housing 1. The guide slots 11 are disposed along the ejection direction of the ejector 2. The guide units 5 are disposed on the outer wall of the ejector 2 and positioned in the guide slots 11.

From the above description it can be known that the utility model has the following beneficial effects: the drive unit drives the rotor to rotate; the rotor drives the ejector to rotate along the circumference of the housing and to move toward the opening; the guide unit is disposed on the outer wall of the ejector and slidably disposed in the guide slots, so when the drive unit drives the rotor to rotate, the guide slots stop the ejector from rotating along with the rotor, and the ejector moves toward the opening. A module is disposed in front of the ejector, and when the ejector moves toward the opening, the module is ejected out. The ejection device of the utility model is not only conveniently operated, but also simple in structure and small in size, does not require a large magnet, and can reduce the product weight.

Further, the rotor 3 is disposed in the ejector 2; the rotor 3 is a screw, and the ejector 2 is a to screw barrel.

Further, a reed switch 6 is also included, and the reed switch 6 is electrically connected with the drive unit 4.

From the above description it can be known that, due to the configuration of the reed switch, when it needs to take out the module, a very small magnet can be used to approach the ejector from the front of the module. When the reed switch is switched on when receiving a magnetic force, a circuit is switched on, and then the drive unit can rotate, thus driving the ejector to move toward the opening. The operation is simple and convenient.

Further, a circuit board 7 is also included; the circuit board 7 is disposed on the outer wall of the housing 1; and the circuit board 7 is electrically connected with the drive unit 4.

Further, a first limit switch 8 and a second limit switch 9 are also included; the first limit switch 8 and the second limit switch 9 are respectively disposed on the circuit board 7 and are electrically connected with the circuit board 7; the guide slots 11 are formed with openings at the bottoms; the guide units 5 extend out of the openings; and the guide units 5 are disposed between the first limit switch 8 and the second limit switch 9.

From the above description it can be known that the guide units are located between the first limit switch and the second limit switch. When the guide units move along with the ejector and touch the first limit switch, the circuit is switched off. In such circumstances, the ejector already reaches the set ejection height, and the module is ejected out. After a period of time, the circuit is switched on again under the control of the circuit board. At this time, the drive unit rotates reversely, and the ejector resets by the effect of the screw threads. When the guide units touch the second limit switch, the circuit is switched off, and the drive unit stops rotating. Thus, the entire circulation operation is completed.

Further, a cushion 10 is also included, and the cushion 10 is disposed on the ejector 2 and positioned at the opening end of the housing 1.

From the above description it can be known that the ejector is provided with the cushion; the ejector directly contacts the module when ejecting the module, and the cushion can protect the module from damaging.

Further, the numbers of the guide slot 11 and the guide unit 5 are respectively two; the two guide slots 11 are respectively symmetrically disposed on the housing 1, and the two guide units 5 are respectively symmetrically disposed on the ejector 2.

From the description it can be known that due to the symmetrical arrangement of the guide slots and guide units, the movement is more stable when the ejector is ejected out.

Refer to FIG. 1 and FIG. 2. Embodiment 1 of the present invention is as follows.

An ejection device includes a housing 1, an ejector 2, a rotor 3, a drive unit 4, guide units 5, a reed pipe 6, a circuit board 7, a first limit switch 8, a second limit switch 9 and a cushion 10, wherein the housing 1 is a hollow structure with an opening; the ejector 2 is disposed in the housing 1; the rotor 3 and the drive unit 4 are respectively disposed in the ejector 2; the rotor 3 is in a transmission connection with the drive unit 4; the drive unit 4 is a motor; during rotating, the rotor 3 drives the ejector 2 to rotate along the circumference of the housing 1 and drives the ejector 2 to move toward the opening. In this embodiment, the ejector 2 is a screw barrel with inner screw threads; the rotor 3 is a screw, and the screw is matched with the screw threads of the screw barrel. Two guide slots 11 are symmetrically formed on the inner wall of the housing 1; the guide slots 11 are disposed along the ejection direction of the ejector 2; the number of the guide unit 5 is two; and the guide units 5 are disposed on the outer wall of the ejector 2 and slidably disposed in the guide slots 11. The cushion 10 is disposed on the ejector 2 and positioned at the opening end of the housing 1.

The circuit board 7 is disposed on the outer wall of the housing 1; the reed pipe 6 is disposed on the circuit board 7; and the reed switch 6 and the drive unit 4 are respectively electrically connected with the circuit board 7. The first limit switch 8 and the second limit switch 9 are respectively disposed on the circuit board 7 and are electrically connected with the circuit board 7. The guide slots 11 disposed close to the circuit board 7 are formed with openings at the bottoms; the guide units 5 extend out of the openings; and the guide units 5 are disposed between the first limit switch 8 and the second limit switch 9.

The working process of the embodiment is as follows. In the initial state, the ejection device is in a retracted state. When it is required to take out the module, a very small magnet is used to approach the ejection device from the front of the module. The reed switch 6 is switched on when receiving a magnetic force, and thus the whole circuit is switched on. After the circuit is switched on, the motor rotates forward, and the rotor 3 is in a transmission connection with the motor, so the rotor 3 rotates along with the motor. The ejector 2 is provided with the guide units 5, and the guide units 5 are disposed in the guide slots 11 on the housing 1, so the housing 1 prevents the ejector 2 from rotating. By the effect of the screw threads, the ejector 2 moves forward, and the guide units 5 move along with the ejector 2. When the guide units 5 touch the first limit switch 8, the circuit is switched off for a short time. In such circumstances, the ejector 2 already reaches the set ejection height, and the module has been ejected out. Then, an operator can easily take out the module. Under the control of the circuit board 7, the circuit is switched on again after a short-term interruption. At this time, the motor rotates reversely, and the ejector 2 resets by the effect of the screw threads. After the guide units 5 touch the second limit switch 9, the circuit is switched off, and the motor stops rotating. Thus, the entire circulation operation is completed.

In conclusion the ejection device provided by the present invention is not only easily operated, but also simple in structure and small in size, does not require a large magnet, and can reduce the product weight.

The above are only some embodiments of the invention and shall not be regarded as limit to the patent. Any equivalent modifications made on the basis of the description and attached drawings or direct or indirect application to the related fields, shall fall within the protective scope of the patent.

The invention claimed is:

1. An ejection device configured for ejection of a module from an LED screen, characterized by comprising a housing, an ejector, a rotor connected to a drive unit and guide units, wherein the housing is a hollow structure with an opening; the ejector is disposed in the housing and connected with the rotor; the drive unit is disposed to drive the rotor to rotate: said rotation being adapted to cause the ejector to move toward the opening; guide slots are located on the inner wall of the housing; the guide slots are disposed along the ejection direction of movement of the ejector towards the opening; and the guide units are disposed on the outer wall of the ejector and slidably disposed in the guide slots such that interaction between the guide units and the guide slots during rotating of the rotor prevents rotation of the ejector and drives the ejector to move toward the opening.

2. The ejection device according to claim 1, characterized in that the rotor is disposed in the ejector; the rotor is a screw; and the ejector is a screw barrel.

3. The ejection device according to claim 1, characterized by also comprising a reed switch which is electrically connected with the drive unit.

4. The ejection device according to claim 3, characterized by also comprising a circuit hoard, the circuit hoard disposed on the outer wall of the housing, and the circuit board electrically connected with the drive unit.

5. The ejection device according to claim 4, characterized by also comprising a first limit switch and a second limit switch, wherein the first limit switch and the second limit switch are respectively disposed on the circuit board and are electrically connected with the circuit board; the guide slots are formed with openings at the bottoms the guide units extends out of the openings; and the guide units are disposed between the first limit switch and the second limit switch.

6. The ejection device according to claim 1, characterized by also comprising a cushion, the cushion disposed on the ejector and positioned on the opening end of the housing.

7. The ejection device according to claim 1, characterized in that the numbers of the guide slot and the guide unit are respectively two; the two guide slots are respectively symmetrically disposed on the housing, and the two guide units are respectively symmetrically disposed on the ejector.

* * * * *